United States Patent [19]
Hausberger et al.

[11] 4,148,861
[45] Apr. 10, 1979

[54] METHOD FOR THE OXIDATION OF VALUES PRESENT IN LOW VALENCE STAGES AND DISSOLVED IN LIQUIDS

[75] Inventors: Helmut Hausberger, Bad Schönborn; Peter Schlosser, Karlsruhe, both of Fed. Rep. of Germany

[73] Assignee: Gesellschaft zur Wiederaufarbeitung von Kernbrennstoffen m.b.H., Leopoldshafen, Fed. Rep. of Germany

[21] Appl. No.: 774,656

[22] Filed: Mar. 4, 1977

[30] Foreign Application Priority Data

Mar. 30, 1976 [DE] Fed. Rep. of Germany ....... 2613536

[51] Int. Cl.$^2$ ............................................. C01G 56/00
[52] U.S. Cl. ........................................... 423/3; 423/8
[58] Field of Search ............................... 423/3, 8, 9, 10

[56] References Cited
U.S. PATENT DOCUMENTS 3,198,599   8/1965   Lewis et al. ........................... 423/10

Primary Examiner—Richard E. Schafer
Attorney, Agent, or Firm—Spencer & Kaye

[57] ABSTRACT

Method for the oxidation of values present in low valence stages in liquids and of compounds which stabilize these low valence stages if they are present. Dinitrogen tetroxide ($N_2O_4$) in liquid form is added to the value solution as an oxidation agent. The oxidation reactions which subsequently take place are conducted as substantially liquid-liquid reactions.

10 Claims, No Drawings

METHOD FOR THE OXIDATION OF VALUES PRESENT IN LOW VALENCE STAGES AND DISSOLVED IN LIQUIDS

BACKGROUND OF THE INVENTION

The present invention relates to a method for the oxidation of values which are present in low valence stages and are dissolved in liquids and to the oxidation of compounds which stabilize these low valence stages.

The selection of an oxidation agent suitable for the oxidation of values which are dissolved in liquids depends substantially on the type of values, on the type of solution in which the values are contained, and on other process parameters. If the oxidation of the values is a partial step, i.e., one step in a total process in which the values are to be separated or recovered, such as, for example, the oxidation of actinides in a reprocessing process for irradiated nuclear fuel and/or breeder materials, the process conditions which must be met to assure flawless operation and the most optimum sequence in the process will permit the use of only certain types of oxidation agents.

For example, aqueous reprocessing processes for irradiated nuclear fuel and/or breeder materials where the values uranium, plutonium and possibly other actinides are obtained in pure form with the aid of liquid-liquid extractions and subsequent further purification measures employ (1) salt-type oxidation agents, such as aqueous sodium nitrite solutions, or (2) gaseous oxidation agents, such as nitric oxides or nitric oxide mixtures ($NO_2$ or $NO+NO_2$, respectively) together with transporting air, in order to oxidize U(IV) to U(VI) or Pu(III) to PU(IV), etc.

The salt-type oxidation agents and the gaseous oxidation agents each have drawbacks. Thus, a drawback in the processes which use salt-type oxidation agents, such as an aqueous sodium nitrite solution, is that the salt-type oxidation agents introduce foreign ions into the process liquid, and thus increase the proportion of solids in the waste material. The processes which use gaseous oxidation agents have the drawback that the gaseous oxidation agents, such as $NO_2$ or a mixture of NO and $NO_2$, react according to stoichiometrically-unfavorable gas-liquid reactions. Therefore, it is always necessary when using gaseous oxidation agents to have a great excess of oxidation agent which again results in heavy stresses on the ventilation systems. Moreover, the required transporting air for the gaseous oxidation agents also removes part of the gaseous oxidation agents from the reaction chamber without them being used.

It has also been attempted to use dinitrogen tetroxide ($N_2O_4$) from commercially-available gas bombs. In this case, nitrogen dioxide ($NO_2$) was produced by heating the $N_2O_4$ and was conducted into the oxidation vessels in a stream of transporting air. When $NO_2$ gas from the $N_2O_4$ gas bombs was used, it was also necessary to have high excess quantities, e.g., about ten times the stoichiometric quantity. The amount of apparatus required for large throughputs is also considerable. The gasification of the liquids being treated must take place in trickling columns, and the excess of oxidation agents must be removed in a subsequent stripping column by blowing in air. This leads to large quantities of contaminated exhaust gas. The costs for the oxidation step with gaseous $NO_2$ from $N_2O_4$ are high. The costs merely for the $NO_2$ gas from $N_2O_4$ amount to about $250.00 per ton of light water reactor fuel to be reprocessed.

SUMMARY OF THE INVENTION

It is therefore an object of the present invention to provide a process which avoids the drawbacks of the prior art processes and permits in a simple manner the required setting of higher valence stages of values, or the oxidation of values, respectively.

A further object of the present invention is to provide such a process during the course of a liquid-liquid extraction process, without increasing the quantity of waste to be solidified and without placing heavy stresses on the ventilation or exhaust gas systems, respectively.

Another object of the present invention is to provide such a process which is safe and not subject to malfunction.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, as embodied and broadly described, the present invention provides a method for the oxidation of values present in low valence stages in liquids and of compounds which stabilize these low valence stages which comprises adding dinitrogen tetroxide ($N_2O_4$) in liquid form to the value solution as an oxidation agent, and conducting the oxidation reactions which subsequently take place as substantially liquid-liquid reactions.

In a preferred embodiment of the process according to the invention, the value solution is cooled to a temperature in the range between $+2°$ and $+20°$ C.; $N_2O_4$ in liquid form is added to the value solution in a quantity which corresponds to but a slight excess beyond the stoichiometric quantity of $N_2O_4$ required for the oxidation of the values and of the stabilizing compounds if they are present; and the low valence stages of the values and of the compounds which stabilize these valence stages are oxidized at a temperature in the range between $15°$ C. and $60°$ C. In one embodiment of the invention, the $N_2O_4$ is added as a dinitrogen tetroxide solution which was made by previously dissolving liquid $N_2O_4$ in water or diluted acid at a temperature in the range of from $+2°$ C. to $+15°$ C. In another embodiment of the invention, the $N_2O_4$ is added in pure liquid form.

The process according to the invention can be used just as well for discontinuous as well as for continuous processes and is not limited to reprocessing processes.

The advantages of the process according to the present invention are very manifold. First, the process of the present invention avoids the use of a large excess of oxidation agent beyond the stoichiometrically-required quantity. By avoiding a large excess of oxidation agent beyond the stoichiometrically-required quantity, for example, in a uranium-plutonium extraction and purification process, not only are the operating costs reduced, but the amount of apparatus required is reduced and the quantities of solid waste and exhaust air are kept low. In addition, the process of the present invention, when employed in a uranium-plutonium extraction and purification process, prevents quantities of nitrite which are formed in the aqueous phase during the extraction from being extracted into the organic phase which is being circulated. A number of distinct disadvantages result if these quantities of nitrite are extracted in the organic phase. Thus, if the quantities of nitrite are extracted into the organic phase, there is an increase in the consumption of reduction agent for the plutonium reduction. Further, the quantities of nitrite in the organic phase oxidize or decompose, respectively, the compounds which stabilize the lower valence stages of the values at the wrong, undesirable point in the process. In addition, if U(IV) salt solutions are used as the reduction agent for plutonium, the quantities of nitrite in the organic phase lead, under certain circumstances, to a so-called "tripping" of the U(IV) valency by reoxidation to U(VI).

Moreover, the process of the present invention does not require the use of transporting air to transport an oxidation gas. Further, the purification of the inactive waste water also becomes easier as a result of the process of the present invention.

It is to be understood that both the foregoing general description and the following detailed description are exemplary, but are not restrictive of the invention.

DETAILED DESCRIPTION OF THE INVENTION

In the practice of the present invention, a solution which contains a value which is to be oxidized and a stabilizer for the value are subjected to treatment with liquid $N_2O_4$. The solution that is treated generally is an aqueous solution and can be one that contains Pu(III) as the value which is to be oxidized or can be one that contains U(IV) as the value to be oxidized. Such solutions are formed during aqueous reprocessing processes for recovering values from irradiated nuclear fuel and/or breeder materials, and generally contain nitric acid. In addition, the present invention can be applied to solutions which arise from other sources and which contain values that are to be oxidized. For instance solutions of basic wash streams from solvent treatment as hydroxylammoniumnitrate, hydrazinehydrate, and/or hydrazinecarbonate solutions or oxalic acid solutions from precipitation steps of Plutonium conversion to oxide.

All these solutions can be oxidized to gaseous products or other values by liquid $N_2O_4$.

The aqueous solutions of the present invention contain a stabilizer which stabilizes the low valence stages of the values which are to be oxidized. In the process of the present invention, the stabilizer is oxidized during the oxidation treatment of the value solution. Exemplary of a stabilizer which is frequently present in the aqueous solution is hydrazine. Other stabilizers which can be present in the value solution and oxidized during the oxidation of the value solution include hydroxylamine solutions as hydroxylaminehydrate or hydroxylamine nitrate.

In the practice of the present invention, dinitrogen tetroxide ($N_2O_4$) in liquid form is added to the value solution as an oxidizing agent.

Experiments regarding the behavior of liquid $N_2O_4$ upon introduction into water, into diluted $HNO_3$, and into concentrated $HNO_3$ have shown the following:

(a) If liquid $N_2O_4$ is introduced into water in drops at about 20° C., there occurs initially a spontaneous evaporation, and, upon further addition of liquid $N_2O_4$, colorless acid striations can be noted in the water and then a blue solution of $N_2O_3$ forms.

All reactions which occur in the solution as a whole are slightly endothermal since a cooling by 5° to 6° C. could be determined.

The main reaction in the dissolution process is a disproportionation reaction in which $HNO_3$ and $HNO_2$ are produced according to formula (1) as follows:

Disproportionation reaction:

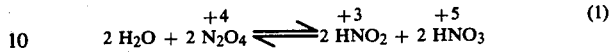

At temperatures above 15° C., the $HNO_2$ formed according to formula (1) decomposes to gaseous nitric oxides which quickly leave the solution, according to formula (2) as follows:

Decomposition reaction to gaseous nitric oxides:

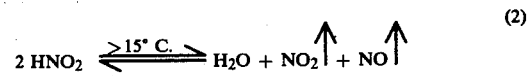

If, however, the liquid $N_2O_4$ is dissolved in water at temperatures below 15° C., the reaction, after disproportionation according to formula (1), takes place according to formula (3) as follows:

Stabilization reaction to liquid nitric oxide:

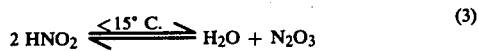

As can be seen from formula (3), at temperatures below 15° C., the $HNO_2$ formed according to formula (1) is converted to liquid $N_2O_3$ (dinitrogen trioxide) which at this temperature range is present in a rather stable solution.

Thus, by appropriately precooling the aqueous solution into which the liquid $N_2O_4$ is introduced, it is possible to introduce liquid $N_2O_4$ without evaporation losses so that any desired quantities of $N_2O_3$ or the equivalent $HNO_2$ are formed and stabilized.

Blue aqueous solutions in which the cold formed $N_2O_3$ is present in liquid form remain stable for hours, even after they have been heated to room temperature. Only when the solution is shaken or stirred will colorless NO and brown $NO_2$ vapors escape.

(b) If liquid $N_2O_4$ is introduced into diluted nitric acid solutions, the liquid $N_2O_4$ behaves in the same manner as if it were introduced into water, that is, it acts in the same manner as noted in (a) above.

(c) If liquid $N_2O_4$ is introduced in concentrated nitric acid, the liquid dinitrogen tetroxide is dissolved without gas formation even at room temperature. In addition to the purely physical dissolution process of the two liquids, which can be mixed at any desired ratio, the chemical disproportionation reaction begins a little more slowly as a result of the lower water concentration in the concentrated acid.

As a result of the behavior noted above in (a) to (c) the introduction of $N_2O_4$ in liquid form into the solution to be treated can be accomplished either by introducing the $N_2O_4$ as a pure liquid, that is, as a liquid which is not dissolved in an aqueous solution or by introducing the $N_2O_4$ in the form of a dinitrogen tetroxide solution in water which was made by previously dissolving liquid $N_2O_4$ in water or diluted acid, such as diluted nitric acid, at a temperature in the range of from +2° C. to +15° C.

The $N_2O_4$ in liquid form, either as pure liquid or as a dinitrogen tetroxide solution, is preferably added to a value solution which has been cooled to a temperature in the range between $+2°$ C. and $+20°$ C. After addition of the $N_2O_4$ to the value solution, the low valence stages of the values and the compounds which stabilize these low valence stages preferably are oxidized at a temperature in the range between 15° C. and 60° C.

Slight excess of $N_2O_4$ within a temperature range between $+2°$ C. and $+20°$ C. means an excess from stoichiometric amount to maximum twice of stoichiometric amount.

The $N_2O_4$ can be used even as liquid or added to water or diluted nitric acid in all concentrations up to concentrated nitric acid.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

This example illustrates the oxidation effect of $N_2O_4$ in liquid form with respect to the stabilization agent hydrazine. In order to examine the oxidation behavior with respect to the stabilization agent hydrazine, 100 ml of a 1.0 M $HNO_3$ solution containing 0.2 M $N_2H_4$ were introduced into a glass column containing Raschig rings and were caused to react with pure $N_2O_4$ in liquid form under various conditions as follows:

(i) If the oxidation agent $N_2O_4$ is added at a temperature of about 30° C., a major portion is lost of the nitrous gases which develop violently during introduction. In order to destroy all of the hydrazine, a total of 8 ml $N_2O_4$ and a reaction period of 160 minutes are required under the above-mentioned test conditions of 30° C., which temperature conditions correspond to those used in the prior art;

(ii) If the oxidation agent $N_2O_4$ is introduced at room temperature, however, the losses of escaping nitrous gases are considerably reduced, as compared to the losses which occur in (i) above. During the course of the oxidation, only half of the quantity of oxidation agent used in (i) above is required in a reaction time which is shortened to 100 minutes; and (iii) If the oxidation agent $N_2O_4$ is introduced into a solution to be oxidized which has been cooled, the $N_2O_4$ dissolves practically without losses. At cooling temperatures of $+2°$ C. to $+15°$ C., $HNO_2$ and $N_2O_3$ are present in the solution as liquid oxidation agents so that, instead of the gas-liquid reactions which predominated at higher temperatures, a much more favorable proportion of liquid-liquid reactions is achieved.

Complete oxidation is connected with a very slow reaction speed at low temperatures, particularly at $+2°$ C. By subsequently heating to 60° C., it is possible, however, to increase the oxidation speed.

In a static experiment, an oxidation period of 30 to 35 minutes is already sufficient with minimum consumption of $N_2O_4$ (3 ml) for the same quantity of hydrazine as in experiment (i).

The oxidation of the agent which stabilizes the low valences of the values is then followed by an increase in the valence stages, e.g., for uranium from U(IV) to U(V); or for plutonium from Pu(III) to Pu(IV), without problems.

EXAMPLE 2

This example illustrates the oxidation effect of $N_2O_4$ in liquid form with respect to a solution containing U(IV) and with respect to a solution containing Pu(III).

In a first experiment, a solution of 0.2 molar $N_2H_4$ which contains 27.2 g/l U(IV) was precooled to 14° C. and introduced into a first Raschig ring column from the top at a flow rate of 600 ml/h. Liquid $N_2O_4$ was introduced into the first column from the bottom at a flow rate of 21 ml/h. The period of dwell for the U(IV) solution in this first column, which serves as a solution column, was about 30 minutes. Then, the liquid was transferred from the first column to a second Raschig ring column, which serves as an oxidation column. The solution was slowly heated in the second column to 60° C. The period of dwell of the solution in the second column was about 40 minutes.

The analysis results indicated that the U(IV) concentration in the solution in the discharge from the second column had dropped to below the limit of proof of $4 \times 10^{-4}$ Mol U(IV)/l and the residual concentration of hydrazine was only $3 \times 10^{-4}$ Mol/l.

An experiment similar to that just described was conducted for the oxidation of a Pu(III)-containing solution, and half of the $N_2O_4$ quantity required for the uranium oxidation was needed for the Pu(III) oxidation.

It will be understood that the above description of the present invention is susceptible to various modifications, changes and adaptations, and the same are intended to be comprehended within the meaning and range of equivalents of the appended claims.

What is claimed is:

1. Method for oxidizing a value present in a low valence stage in an aqueous solution and if present oxidizing a compound which stabilizes this low valence stage, said aqueous solution arising in a reprocessing process for irradiated nuclear fuel and/or breeder material, the value being U(IV) or Pu(III) comprising adding dinitrogen tetroxide ($N_2O_4$) in liquid form to the aqueous solution as an oxidation agent in an amount which corresponds to only a slight excess over the amount of $N_2O_4$ required stoichiometrically to oxidize the value and the stabilizing compound, and conducting the oxidation reactions which subsequently take place as substantially liquid-liquid reactions.

2. Method as defined in claim 1, including:
 (a) cooling the aqueous solution to a temperature in the range between $+2°$ C. and $+20°$ C.;
 (b) adding the $N_2O_4$ in liquid form to the cooled aqeuous solution; and
 (c) oxidizing the low valence stages of the values and the compounds which stabilize these valence stages at a temperature in the range between 15° C. and 60° C.

3. Method as defined in claim 2, wherein the $N_2O_4$ is added as a dinitrogen tetroxide solution which was made by previously dissolving liquid $N_2O_4$ in water or diluted or concentrate nitric acid at a temperature in the range of from $+2°$ C. to $+15°$ C.

4. Method as defined in claim 2, wherein the $N_2O_4$ is added in pure liquid form.

5. Method as defined in claim 1, wherein the aqueous solution contains hydrazine as a compound which stabilizes the low valence stage.

6. Method for oxidizing, in a wash solution, a compound which stabilizes the low valence stage of U(IV) or Pu(III), which valence stage is present in a liquid solution arising in a reprocessing process for irradiated nuclear fuel and/or breeder material, comprising adding dinitrogen tetroxide ($N_2O_4$) in liquid form to the wash solution as an oxidation agent, and conducting the oxidation reactions which subsequently take place as substantially liquid-liquid reactions.

7. Method as defined in claim 6, including:
   (a) cooling the wash solution to a temperature in the range between +2° C. and +20° C.;
   (b) adding the $N_2O_4$ in liquid form to the cooled wash solution in a quantity which corresponds to only a slight excess over the quantity of $N_2O_4$ required stoichiometrically to oxidize the stabilizing compound; and
   (c) oxidizing the compound which stabilizes the valence stages at a temperature in the range between 15° C. and 60° C.

8. Method as defined in claim 7, wherein the $N_2O_4$ is added as a dinitrogen tetroxide solution which was made by previously dissolving liquid $N_2O_4$ in water or diluted or concentrate nitric acid at a temperature in the range of from +2° C. to +15° C.

9. Method as defined in claim 7, wherein the $N_2O_4$ is added in pure liquid form.

10. Method as defined in claim 6, wherein the wash solution contains hydrazine as a compound which stabilizes the low valence stage.

* * * * *